March 5, 1940. J. G. ADKINS 2,192,670
VALVE
Filed Feb. 2, 1939 2 Sheets-Sheet 1
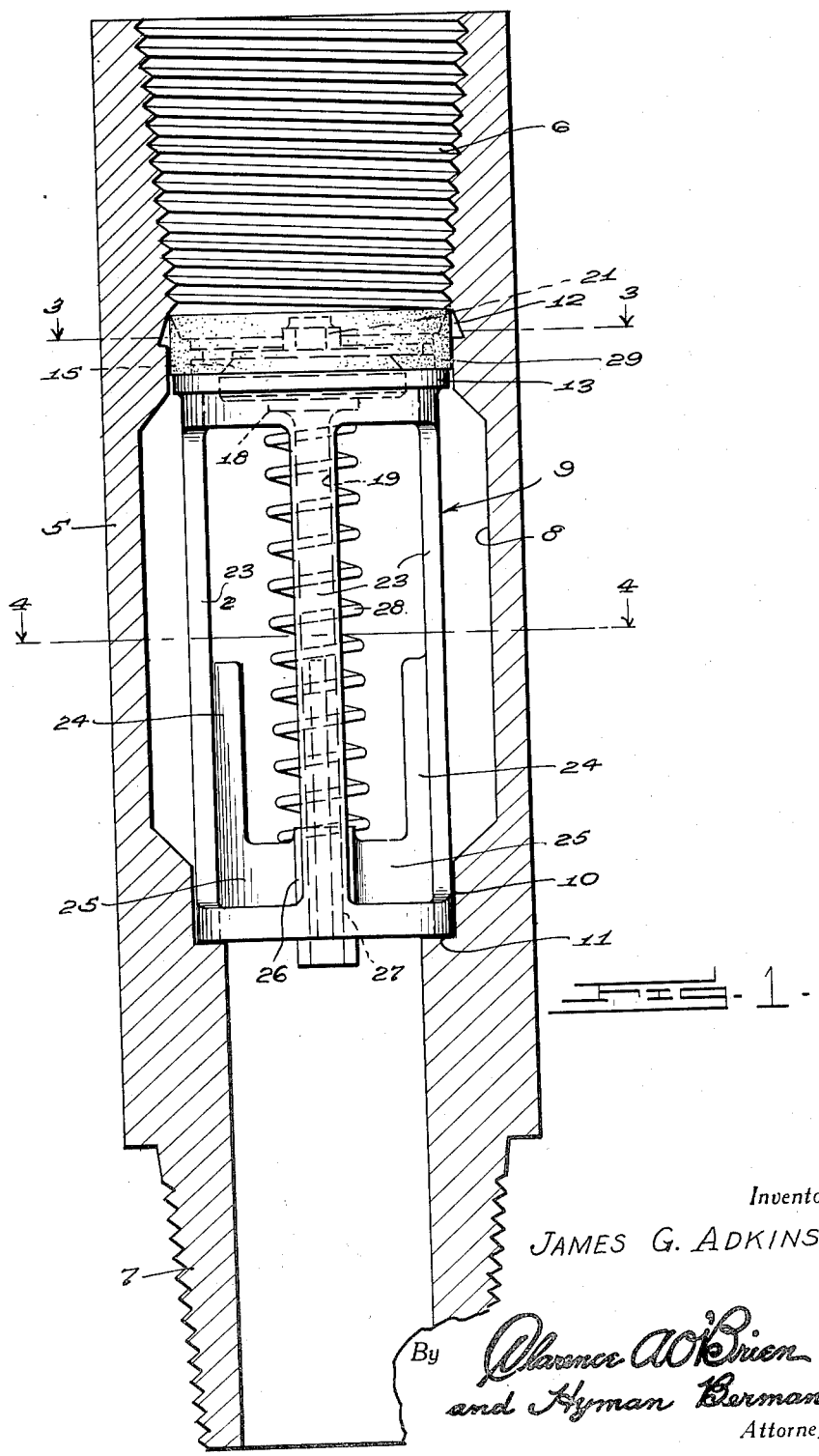
Inventor
JAMES G. ADKINS,
By Clarence A. O'Brien
and Hyman Berman
Attorneys

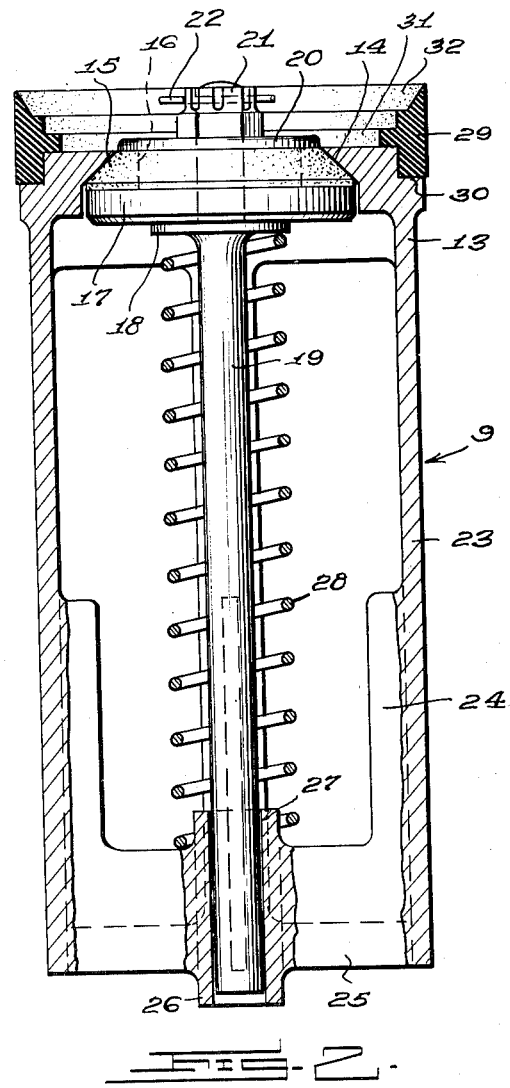

Patented Mar. 5, 1940

2,192,670

UNITED STATES PATENT OFFICE 2,192,670

VALVE

James Gilliam Adkins, Cheney, Kans.

Application February 2, 1939, Serial No. 254,321

1 Claim. (Cl. 137—69)

This invention appertains to new and useful improvements in valves and more particularly to a combination float valve and float joint for rotary drill pipes.

The principal object of the present invention is to provide a float valve assembly and joint which can be placed in a string of rotary drill pipes at any point desired.

Another important object of the invention is to provide a float valve assembly which can be readily removed for the purpose of repair or replacement of parts.

These and other important objects and advantages of the invention will become apparent to the reader of the following specification.

In the drawings:

Figure 1 represents a longitudinal sectional view through the joint showing the valve assembly in side elevation.

Figure 2 is a longitudinal sectional view through the valve assembly.

Referring to the drawings wherein like numerals designate like parts, it can be seen that numeral 5 represents the coupling or joint tube which at its upper end is formed with the inwardly tapering threaded bore 6 and at its lower end with the tapered and threaded nipple 7.

The intermediate portion of the shell 5 is counter-bored to form the enlarged pocket 8 which circumscribes the valve assembly generally referred to by numeral 9. At a point below the pocket the inside of the shell is further bored, as at 10, to define the shoulder 11 upon which the valve assembly 9 can rest.

A downwardly flaring circumferential groove 12 is formed inside of the shell 5 just above the pocket 8 for receiving the upper resilient portion of the valve assembly when a pipe section is fed into the upper portion of the joint section 5 and engaged into the resilient portion of the valve assembly.

The valve assembly which is generally referred to by numeral 9 consists of the cylindrical head portion 13. This head portion 13 has an opening through the top thereof and is beveled at its underside to form the valve seat 14 for the resilient beveled valve element 15 which is in the form of a ring circumscribing the reduced extension 16 of the backer plate 17. Numeral 18 represents a circumferential flange on the valve stem 19 upon which the backer plate 17 rests, the valve element 15 being clamped between the backer plate 17 and the washer 20 by the nut 21 threadedly disposed on the upper end of the valve stem 19 and held against displacement by a cotter pin or the like 22.

Depending from the head 13 are the parallel frame members 23, each of which has an inwardly disposed fin 24 extending inwardly toward the stem 19 and extending from a mid-point of the members 23 downwardly to the lower ends thereof. The lower ends of these fins merge with the webs 25 which extend inwardly and merge with the cylindrical guide 26 through which the lower portion of the stem 19 is disposed.

The guide 26 has an upwardly disposed portion 27 around which the lowermost convolution of the compression spring 28 is disposed. The upper end of the compression spring is disposed against the flange 18 which underlies the valve element backer plate 17, as clearly shown in Figure 2.

Obviously, when pressure is exerted against the valve structure, the valve will move to an open position and the fluid under pressure can pass downwardly through the valve assembly. However, the valve element cannot open to a position below the upper ends of the fins 24. Thus the valve assembly is left entirely open and there is no undue exertion of the spring 28.

With the connection of the pipeline made to the coupling shell 5, the adjacent pipeline end will be engaged into the resilient annulus 29 which seats on the shoulder 30 of the valve assembly head 13. An inwardly disposed circumferential rib 31 and the shoulder 30 limit downward movement of the annulus 29 on the head 13. The upper interior portion of the annulus 29 is beveled, as at 32, for the purpose of receiving the pipe end (not shown) and as the pipe end moves into this beveled portion of the annulus 29 it is expanded into the downwardly flaring groove 12 of the coupling shell 5, thus forming a packing to prevent any likelihood of the escape of pressure.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A float valve assembly for a drill pipe line comprising a pipe section having an intermediate part of its bore enlarged, a seat formed in the section below the enlargement, and said section having an annular groove therein above the enlargement, said groove flaring downwardly and having a horizontal bottom wall, the bore of the section being threaded in its upper end with the threaded part terminating at said groove, the threaded part adapted to receive the lower end of an adjacent pipe section and a valve cage having its lower end resting against the seat with its upper end adjacent the annular groove and a resilient annular member carried by said upper end of the cage and having a beveled upper portion which is pressed into the annular groove when said adjacent pipe section is threaded into the upper end of the first-mentioned pipe section.

JAMES GILLIAM ADKINS.